US010655467B2

(12) United States Patent
Tian et al.

(10) Patent No.: US 10,655,467 B2
(45) Date of Patent: May 19, 2020

(54) METHOD FOR IMPLEMENTING A CENTRALIZED CONTROL PLATFORM OF HYDRAULIC SUPPORT ON FULLY MECHANIZED MINING WORKING FACE IN UNDERGROUND COAL MINES

(71) Applicant: Taiyuan University of Technology, Taiyuan (CN)

(72) Inventors: Muqin Tian, Taiyuan (CN); Chunyu Xu, Taiyuan (CN); Jiancheng Song, Taiyuan (CN); Wen Chai, Taiyuan (CN); Long Zhao, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 42 days.

(21) Appl. No.: 15/869,944

(22) Filed: Jan. 12, 2018

(65) Prior Publication Data

US 2018/0135412 A1   May 17, 2018

Related U.S. Application Data

(63) Continuation of application No. PCT/CN2016/000368, filed on Jul. 8, 2016.

(30) Foreign Application Priority Data

Jul. 20, 2015  (CN) .......................... 2015 1 0425692
Aug. 25, 2015  (CN) .......................... 2015 1 0527484

(51) Int. Cl.
*E21D 23/14* (2006.01)
*E21D 23/12* (2006.01)
(Continued)

(52) U.S. Cl.
CPC ........... *E21D 23/12* (2013.01); *E21D 23/142* (2016.01); *E21D 23/144* (2016.01);
(Continued)

(58) Field of Classification Search
CPC ... E21D 23/142; E21D 23/144; E21D 23/146; E21D 23/148; E21D 23/12; E21D 23/14
(Continued)

(56) References Cited

U.S. PATENT DOCUMENTS 4,330,154 A * 5/1982 Harris .................... E21D 23/14
                                                        299/1.7
4,518,285 A * 5/1985 Weber .................. E21D 23/144
                                                        299/33
(Continued)

FOREIGN PATENT DOCUMENTS

CN         101418688         4/2009
CN         101727085         6/2010
(Continued)

OTHER PUBLICATIONS

The State Intellectual Property Office of People's Republic of China, First Office Action issued in connection with Chinese Application No. 201510425692.9 with English translation, dated Jul. 25, 2018, 7 pages.
(Continued)

*Primary Examiner* — David J Bagnell
*Assistant Examiner* — Michael A Goodwin
(74) *Attorney, Agent, or Firm* — Hanley, Flight & Zimmerman, LLC

(57) ABSTRACT

A method for implementing a centralized control platform of a hydraulic support on a fully mechanized mining working face in underground coal mines, which is used for safety production in the underground coal mines. A Siemens PLC S7-300, a C8051F020 single chip microcomputer, a PowerBuilder tool, an SQLServer database and a multi-protocol communication platform are selected to form the centralized control platform, wherein the PowerBuilder tool is used as a front-end development platform; the Siemens PLC S7-300
(Continued)

and the C8051F020 single chip microcomputer are used as a real-time control platform; the PLC is connected to an electro-hydraulic control system, and a communication protocol thereof is a TCP/IP MODBUS protocol; the PLC acts as a client; the electro-hydraulic control system acts as a server end; an infrared transmission apparatus is mounted on a coal mining machine; a receiving apparatus is embedded into a support controller of the electro-hydraulic control system; and after receiving infrared information, the support controller transmits the information to an explosion-proof computer of the electro-hydraulic control system. The method may satisfy control functions required by an unattended or nearly unattended working face; can reliably complete various control functions based on operation of an adjacent support; can remotely transmit various pieces of information to a ground monitoring center in real time; and can monitor various failures in coal mining process in real time.

5 Claims, 3 Drawing Sheets

(51) Int. Cl.
　　G05B 19/05　　(2006.01)
　　E21C 41/18　　(2006.01)
(52) U.S. Cl.
　　CPC .......... E21D 23/148 (2016.01); G05B 19/05 (2013.01); G05B 19/054 (2013.01); E21C 41/18 (2013.01); *G05B 2219/13004* (2013.01); *G05B 2219/15038* (2013.01); *Y02P 80/114* (2015.11)
(58) Field of Classification Search
　　USPC .................................................. 299/1.6, 1.7
　　See application file for complete search history.

(56) References Cited

U.S. PATENT DOCUMENTS

| | | | | |
|---|---|---|---|---|
| 5,029,943 | A * | 7/1991 | Merriman | E21C 35/24 299/1.7 |
| 5,137,336 | A * | 8/1992 | Merten | E21C 35/24 299/1.7 |
| 6,481,802 | B1 * | 11/2002 | Kussel | E21C 35/24 299/1.6 |
| 6,509,842 | B1 | 1/2003 | Kussel | |
| 2006/0220438 | A1 * | 10/2006 | Kellermann | E21D 23/26 299/1.7 |
| 2011/0224835 | A1 | 9/2011 | Stenhaug et al. | |
| 2012/0091782 | A1 * | 4/2012 | Wesselmann | E21C 35/24 299/18 |
| 2016/0362980 | A1 * | 12/2016 | Knuth | E21D 23/26 |

FOREIGN PATENT DOCUMENTS

| | | |
|---|---|---|
| CN | 101906985 | 12/2010 |
| CN | 102004483 | 4/2011 |
| CN | 102102519 | 6/2011 |
| CN | 102619511 | 8/2012 |
| CN | 103306700 | 9/2013 |
| CN | 203191811 | 9/2013 |
| CN | 203965908 | 11/2014 |
| CN | 104184637 | 12/2014 |
| CN | 104775839 | 7/2015 |
| CN | 105065050 | 11/2015 |
| JP | H09158681 | 6/1997 |
| KR | 20060072423 | 6/2006 |

OTHER PUBLICATIONS

The State Intellectual Property Office of People's Republic of China, Search Report issued in connection with Chinese Application No. 201510425692.9, with English translation, dated Jul. 25, 2018, 2 pages.

International Searching Authority, International Search Report, issued in connection with International Application No. PCT/CN2016/000368, dated Oct. 8, 2016, 5 pages.

The State Intellectual Property Office of People's Republic of China, First Office Action issued in connection with Chinese Application No. 201510527484.X, with English translation, dated May 5, 2017, 8 pages.

The State Intellectual Property Office of People's Republic of China, Search Report issued in connection with Chinese Application No. 201510527484.X, with English translation, dated May 5, 2017, 3 pages.

* cited by examiner

METHOD FOR IMPLEMENTING A CENTRALIZED CONTROL PLATFORM OF HYDRAULIC SUPPORT ON FULLY MECHANIZED MINING WORKING FACE IN UNDERGROUND COAL MINES

RELATED APPLICATION

This patent arises from an application that is a continuation of International PCT Application No. PCT/CN2016/000368, filed on Jul. 8, 2016, and is hereby incorporated by reference in its entirety. Further, this patent claims priority to Chinese Patent Application 201510425692.9, which was filed on Jul. 20, 2015, and Chinese Patent Application 201510527484.X, which was filed on Aug. 25, 2015, both of which are hereby incorporated by reference in their entireties.

TECHNICAL FIELD

The invention relates to a method for implementing a centralized control platform, in particular to a method for implementing a centralized control platform of a hydraulic support on a fully mechanized mining working face in underground coal mines.

BACKGROUND

Automation level of coal mining production process of a country can directly reflect its status in the international industrial field and can measure a nation's industrial strength. At the beginning of last century, because the basic form of energy in the world is coal, much effort has been made in coal mining technology research around the world.

An unattended or nearly unattended working face had been born in the 1980s in the United Kingdom, that is to say, a coal mining working face only needs a few people to complete automatic link-up of main links including mining, supporting, transporting and supplying, which achieves the purpose of efficient production and greatly improves production efficiency. However, there has not been a report at home and abroad on application of an intelligent integrated control system in which multiple equipment automatic control systems are unified and coordinated under the control of the centralized control platform.

Accordingly, it is very necessary to establish a system model of a centralized control platform of a large-size equipment on a fully mechanized mining working face, to explore a centralized collaborative intelligent control law of a group control system on the fully mechanized mining working face, to propose a model-based intelligent control method and control strategy suitable for coal mining equipments on the fully mechanized mining working face, and to provide theoretical and technical support for realizing the goal of unattended automated mining on the fully mechanized mining working face, and which all belong to urgent research hotspots.

SUMMARY OF THE INVENTION

The invention has a purpose to provide a method for implementing a centralized control platform of a hydraulic support on a fully mechanized mining working face in underground coal mines on the basis of the technology of an existing coal mining machine, to solve the problem of centralized control of a hydraulic support on an unattended working face in the underground coal mines.

To realize the purpose, the invention adopts the technical solution as follows: a Siemens PLC S7-300, a C8051F020 single chip microcomputer, a PowerBuilder tool, an SQLServer database and a multi-protocol communication platform (including a serial port MODBUS protocol, a TCP/IP MODBUS protocol and various protocol conversion interfaces) device are selected to form the centralized control platform, wherein the PowerBuilder tool is used as a front-end development platform; the Siemens PLC S7-300 and the C8051F020 single chip microcomputer are used as a real-time control platform to realize centralized control of a hydraulic support on a fully mechanized mining working face in the underground coal mines; the PLC is connected to an electro-hydraulic control system, and a communication protocol thereof is a TCP/IP MODBUS protocol; the PLC acts as a client; the electro-hydraulic control system acts as a server end.

An infrared transmission apparatus is mounted on a coal mining machine, and a receiving apparatus is embedded into a support controller of the electro-hydraulic control system. When the coal mining machine moves to a support, infrared information will be received at the support. When an end controller of the electro-hydraulic control system inspects the support controller, the support controller may collect position information, front pillar pressure, rear pillar pressure, displacement stroke, first state variables (including: presence or absence of a scram signal, presence or absence of a blocking signal, presence or absence of an infrared signal, whether pillar pressure is normal or not, whether the displacement is in place or not and whether communication between apparatuses is normal or not) of the coal mining machine together, and then transmit them to an explosion-proof computer of the electro-hydraulic control system.

The Siemens PLC S7-300 of the centralized control platform communicates through TCP/IP to transmit the position of the coal mining machine to the explosion-proof computer of the electro-hydraulic control system in real time; the position of the coal mining machine is obtained by calculating number of ring chains that the coal mining machine travels;

the electro-hydraulic control system includes three layers of network structure, namely a support controller, an end centralized control system and a crossheading monitoring system, wherein the crossheading monitoring system is developed on the front-end development platform of the PowerBuilder tool, the end centralized control system and the support controller are developed by the C8051F020 single chip microcomputer, the three layers of network structure are connected by a MODBUS communication protocol. The crossheading monitoring system realizes TCP/IP protocol-based network communication by introducing Winsock by a PowerBuilder external matter OLE, in the communication process, there exists an ocx_error event script to monitor failures of communication, and once there is a failure of disconnection, re-connection is performed immediately, which ensures stable and reliable data communication:

ole_2.object.close( )
  ole_2.object.protocol=0//winsock the communication protocol is set as a TCP protocol
  ole_2.object.localport=502//winsock communication port number of the machine
  ole_2.object.listen( )
  ss=0
  sle_1.text="TCP/IP communication error, reconnection has been done!"

Specific Contents of the Invention are as Follows:

(1) When coal mining starts on the fully mechanized mining working face, the coal mining machine is at one end of the working face, the position of the coal mining machine at that time is an initial position, the Siemens PLC S7-300 firstly transmits a command of startup to the electro-hydraulic control system, and after obtaining a response that the electro-hydraulic control system has been prepared, the Siemens PLC S7-300 transmits a position signal of the coal mining machine and a process stage signal to the electro-hydraulic control system and at the same time starts the coal mining machine. During the starting process, the communication protocol of the Siemens PLC S7-300 and the electro-hydraulic control system is a TCP/IP MODBUS protocol, the Siemens PLC S7-300 acts as a client, the electro-hydraulic control system acts as a server end.

(2) During working on the fully mechanized mining working face, the electro-hydraulic control system sends out a centralized control command based on an infrared position signal of the coal mining machine and a position detection signal of an encoder of the coal mining machine, such that the related hydraulic support automatically tracks the coal mining machine to carry out corresponding operation. According to the production process requirement of coal mines, in the present invention, the centralized control platform completes a centralized control function once, and the support for tracking the coal mining machine for corresponding operations involves thirty hydraulic supports, including one coal mining machine in-place hydraulic support, fourteen coal mining machine front hydraulic supports and fifteen coal mining machine rear hydraulic supports;

(3) The explosion-proof computer of the electro-hydraulic control system compares the position of the coal mining machine that is inspected by the support controller with the position of the coal mining machine that is sent by the explosion-proof computer in the crossheading monitoring system, if the two positions are the same, the explosion-proof computer transmits normal information, and the centralized control platform continues to implement next control; if the two positions are different, the explosion-proof computer transmits alarm information such that the centralized control platform stops giving a centralized control command.

(4) The Siemens PLC S7-300 transmits the number of the current process stage and the position detection signal of the encoder of the coal mining machine to the electro-hydraulic control system every 0.5 s, after receiving the information, the electro-hydraulic control system responds information including front pillar pressure, rear pillar pressure, displacement stroke, whether the hydraulic support is normal or not, whether the support controller is normal or not, whether the end controller is normal or not and whether communication is normal or not, of thirty supports, namely the coal mining machine in-place support, the fourteen coal mining machine front supports and the fifteen coal mining machine rear supports, so that the centralized control platform makes judgment whether centralized control can be continued or not.

(5) The electro-hydraulic control system controls operation of the hydraulic support; based on the number of process stage and the coal mining machine position information that are transmitted by the centralized control platform, the electro-hydraulic control system judges anytime whether physical variables related to the operation reach limit parameters or not, e.g., judges whether pillar pressure reaches a limit value or not; judges whether or not the displacement stroke is still not in place after the given operation limit time has passed; judges whether control information and return information form a closed loop or not; and judges whether communication is smooth or not, such that corresponding operation can be stopped at the first time to prevent an accident.

(6) The centralized control platform transmits a write request of the number of process stage and the coal mining machine position to the electro-hydraulic control system, and at the same time transmits a read request for collecting signals of the electro-hydraulic control system in real time to the electro-hydraulic control system. After obtaining a request from the centralized control platform, the electro-hydraulic control system firstly judges the type of the request and then executes corresponding process.

(7) After the electro-hydraulic control system has received the read request from the centralized control platform, the explosion-proof computer of the electro-hydraulic control system transmits data in the read request in the form of a TCP/IP MODBUS protocol to the centralized control platform, that is, firstly transmits the first five numbers that are received, and secondly transmits (the number required by the client)*2+3, and thirdly transmits the 7th and the 8th numbers (i.e., device address and function code) that are received, and fourthly transmits (the number required by the client)*2, and fifthly transmits a head address where the data is saved, and next transmits data volume in sequence, and finally transmits a check code.

(8) After receiving the data, the centralized control platform performs analysis and judgment, and stops operation of the coal mining machine timely when there is a failure and gives an alarm at the same time.

After the electro-hydraulic control system has received the control command from the centralized control platform, one approach is that the explosion-proof computer of the electro-hydraulic control system decomposes and transmits the information to the end centralized control system, then the end controller of the end centralized control system further sends down to the support controller of the support control system to implement specific control; another approach is that the explosion-proof computer of the electro-hydraulic control system directly decomposes and transmits the information to the support controller of the support control system to implement specific control.

1) After the explosion-proof computer of the electro-hydraulic control system transmits the control command to the end controller of the end centralized control system by a serial port MODBUS protocol, the end controller realizes automatic machine tracking and frame pulling according to an infrared position signal of the coal mining machine and a coal mining process stage.

The control process for realizing automatic machine tracking and frame pulling includes three stages: inspection, judgment and control, wherein the position of the coal mining machine is obtained by one inspection, and a traveling direction of the coal mining machine on the working face is judged by inspecting the position of the coal mining machine two times; the inspection is that the end controller of the end centralized control system accesses each support controller for one time in the form of C8051F020 serial port multi-level communication work every 0.5 s, to collect all of the information of the support controller into the end controller; the judgment is that the end controller firstly judges whether the position of the coal mining machine inspected by the support controller is consistent with the position of the coal mining machine transmitted by the explosion-proof computer or not according to the collected information of the support controller and an infrared position signal of the coal mining machine and a coal mining process stage that are transmitted by the explosion-proof computer through the serial port, if the position of the coal mining machine inspected by the support controller is not consistent with the position of the coal mining machine transmitted by the explosion-proof computer, the end controller gives an alarm and stops operation, and if the position of the coal mining machine inspected by the support controller is consistent with the position of the coal mining machine transmitted by the explosion-proof computer, the end controller proceeds to next control stage, that is, according to coal mining process procedure, transmits commands to related support controllers around the coal mining machine to control corresponding hydraulic supports to operate in accordance with the sequence of frame dropping—bottom lifting—frame pulling—frame raising, to perform machine tracking and frame pulling.

By inspecting position signals of the coal mining machine in real time, a traveling direction of the coal mining machine on the working face is judged, according to coal mining process procedure, commands are transmitted to the support controllers operating around the coal mining machine to control corresponding hydraulic supports to perform machine tracking and frame pulling operation. Each related support has an operation procedure including frame dropping, bottom lifting, frame pulling and frame raising, and sequential order of these actions cannot be changed, bottom lifting can be performed only after frame dropping has been completed, otherwise, a top plate may easily be encountered and the hydraulic support may be damaged. The frame pulling is performed after the bottom lifting is completed, and the frame raising can be performed only after the frame pulling is completed; all of the related supports can realize automatic machine tracking and ring pushing function, and a centralized control ring pushing process includes a middle section ring pushing, a curved section ring pushing and ring pushing in cutting triangle coal.

2) The explosion-proof computer of the electro-hydraulic control system directly inspects and judges, and judges the traveling direction of the coal mining machine on the working face by inspecting a position signal of the coal mining machine in real time according to an infrared position signal of the coal mining machine and a coal mining process stage, and according to the coal mining process procedure, transmits control commands to the support controllers that shall operate around the coal mining machine by a serial port MODBUS protocol to control corresponding hydraulic supports to perform machine tracking and frame pulling. Operation procedure for each related support is as described in the above.

The invention is applied to safety production in the underground coal mines and thus has practicability.

The invention has the following beneficial effects: a high degree of automation, which can satisfy control functions required by an unattended or nearly unattended working face; can reliably complete various control functions based on operation of an adjacent support; has automatic machine tracking and frame pulling function under centralized control; can complete crossheading remotely adjusting control function based on video; can remotely transmit various information to a ground monitoring center in real time; can monitor various failures during coal mining in real time; the invention realizes automation of production in coal mines, and fills the blank of unattended coal mining production in China.

DETAILED DESCRIPTION OF THE EMBODIMENT

Hereinafter the implementing method according to the present invention is further described in detail in specific embodiment by incorporating accompanying drawings. Having reviewed the specific embodiment, persons skilled in the art can implement a control method of a centralized control platform of a hydraulic support on a fully mechanized mining working face in underground coal mines as described in the present invention by utilizing an existing explosion-proof computer of the hydraulic support, an end controller, a support controller by combining a Siemens PLC S7-300, a C8051F020 single chip microcomputer, a PowerBuidler tool, an SQLServer database and a multi-protocol communication platform, and meanwhile can realize the positive effects described in the present invention.

Embodiment 1

The method of the invention is to realize centralized control of a hydraulic support on a fully mechanized mining working face in the underground coal mines, by using a PowerBuilder tool as a front-end development platform and using a Siemens PLC S7-300 and a C8051F020 single chip microcomputer as a real-time control platform.

Figure 1:
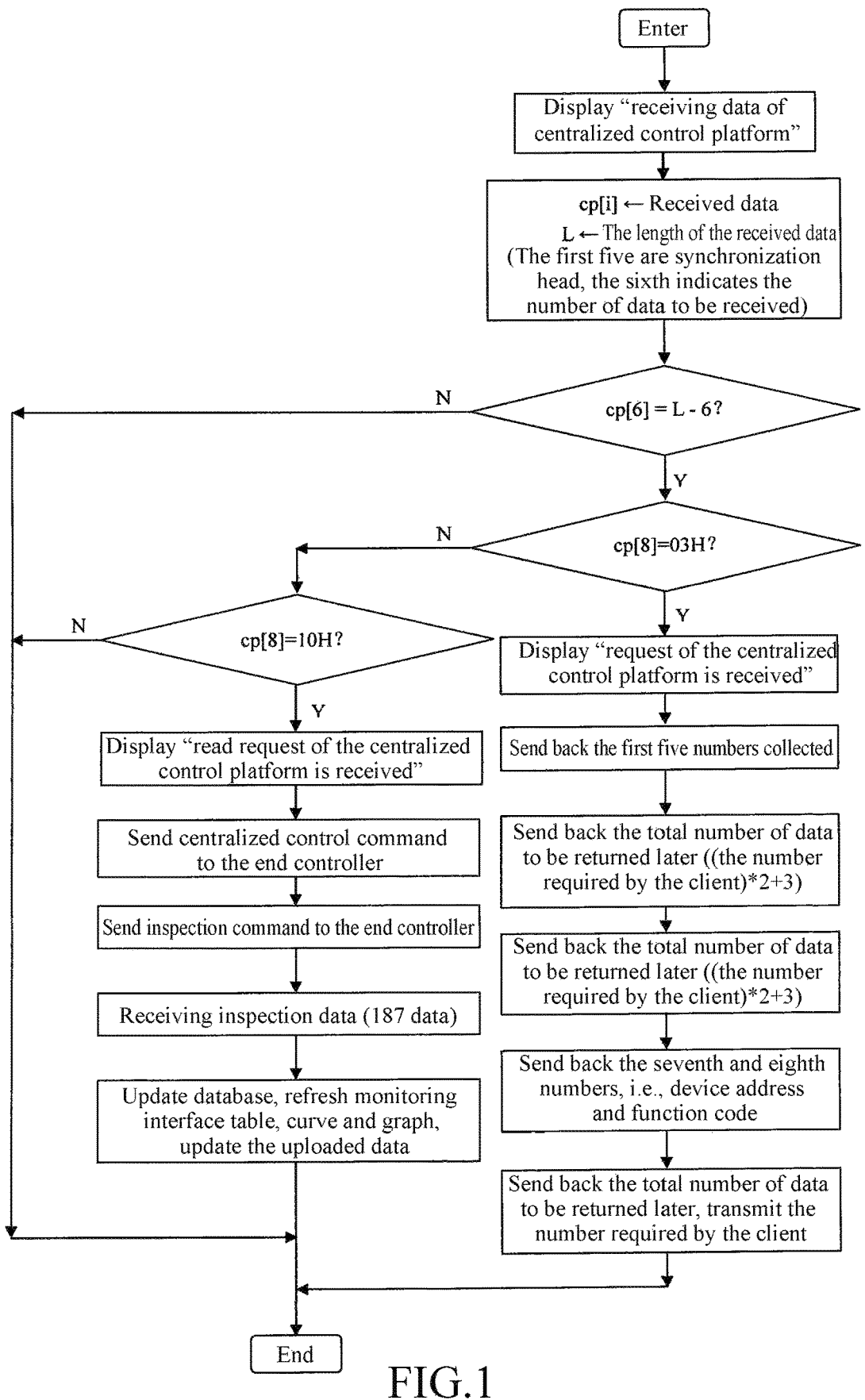
FIG. 1 is a flowchart that an electro-hydraulic control system of a hydraulic support responds to a control command of a centralized control platform according to an embodiment 1 of the invention.

FIG. 1 is a control flow chart that a hydraulic support tracks the coal mining machine to implement corresponding operation, and the specific implementing method comprises the following:

1) Implementation of a TCP/IP Remote Control Function of the Centralized Control Platform The centralized control platform transmits the number of process stage and the coal mining machine position to the centralized control computer of the electro-hydraulic control system by the TCP/IP protocol, and collects operating data of the electro-hydraulic control system in real time.

The centralized control platform acts as a client, the electro-hydraulic control system acts as a server end, a first party (as a server end) winsock communication protocol is to be set in an open event of a control interface of the electro-hydraulic control system that is developed by the PowerBuilder front-end development platform, and is to be set in the state of waiting for call. An error event, a data reach event, an event of reception of a connection request from the other side and a transmission completion event program are complied in an external matter winsock widget. The electro-hydraulic control system is to decompose the commands such as startup, process stage or the like and transmit them to corresponding controlled systems to realize corresponding actions, at the same time the electro-hydraulic control system returns the operation data to a host machine of the platform, the centralized control platform judges an error mark so as to send a signal for stopping operation of the electro-hydraulic control system and alarm in real time when there is a failure.

2) Centralized Control Parameters Remote Setting (1) Remote parameters setting and query include setting working parameters and limit parameters when the hydraulic support on the working face is in operation on the centralized control platform, so as to provide working parameters required for displaying to real-time monitored interfaces of the system on one hand, and on the other hand to transmit the working parameters to the electro-hydraulic control system through a communication network, then the end controller of the electro-hydraulic control system transmits the parameters to the support controller, as controlling basis and restriction parameters when the support controller is in operation.

The working parameters and limit parameters include number of electro-hydraulic supports on the working face, a maximum pillar pressure, a pillar in-place pressure, a maximum ring-pushing stroke, number of groups of pushing rings, a longest ring pushing time, a longest pillar raising time, a longest pillar dropping time, a longest frame pulling time, a longest protecting wall unfolding time, a longest protecting wall folding time, a longest telescopic girder unfolding time, and a longest telescopic girder folding time, to be remotely set. The remotely set parameters are firstly transmitted to the end controller, which then transmits them to each support controller on the working face.

(2) The realized interface title is "control data transmission system" including two portions, one of which is "transmission parameters input region" and the other one is "operation commands enter region", and the two regions are boxed by groupbox widgets respectively. This function achieves to transmit parameters.

The parameters to be set are listed, with names of the parameters written on the left and a single line of editing widgets on the right, so as to input parameter values, the parameters are arranged uniformly in lines according to the number of the parameters, after all of the parameters are entered, "send" button is pressed and the function of transmitting parameters is realized.

3) Remote Control

This module mainly refers to that the centralized control platform remotely controls the hydraulic support.

(1) The remote control function is to realize the function of transmitting an action control command to a support on the working face by clicking a simulation soft keyboard on the centralized control platform.

On the centralized control platform, fourteen groups of actions for remotely controlling the hydraulic supports can be realized, including raising front pillars, raising rear pillars, dropping front pillars, dropping rear pillars, single frame pushing ring, lifting bottom, pulling frame, unfolding protecting sides, folding protecting sides, unfolding protecting wall, folding protecting wall, spraying mist, unfolding telescopic girder and folding telescopic girder. A control command is firstly transmitted to the end controller, then the end controller transmits it to the support controller, and then starts to wait for receiving return information of the end controller, and if no return information is received within prescribed time, then information that transmission fails is displayed.

(2) The realized interface title is "centralized control platform control data transmission system" including two portions, one of which is "transmission parameters input region" and the other one is "operation commands enter region", and the two regions are boxed by groupbox widgets respectively. This function achieves to transmit operation commands.

The icons of control actions are arranged in accordance with the keyboard of the controller, and at the same time two dropdownlistbox widgets are set, and all numerical values from 1 to the total number of supports on the working face are listed in the two dropdownlistbox widgets in the open event of the window. One of the dropdownlist box widgets is used for selecting the serial number of an acting support, and the other is used for selecting the serial number of the last acting support, after the support to perform action and the type of the action are selected, "send" button is pressed to realize the function of transmitting the action.

4) Remote Inspection of Operating State of Supports on Working Face (1) In order to monitor operating state of underground working face in real time, the centralized control platform accesses the end controller at regular time to acquire operating parameters and working state of each support and the support controller itself.

The centralized control platform transmits a parameter inspection command to the end controller of the electro-hydraulic control system every one second, then waits for data information transmitted back from the end controller, and the centralized control platform communicates with the end controller by CRC check. If no return information is received within prescribed time or the received return information is not accurate, then information that data reception fails is displayed.

(2) This function is realized on the interface "working face hydraulic support working state remote real-time remotely monitoring function".

5) Working Face Hydraulic Support Working State Remote Real-Time Remotely Monitoring Function (1) The simulation monitoring interface vividly displays the number of supports on the underground working face, pillar pressure of the supports, pushing stroke, position of the coal mining machine, production situation of the working face in an emergency stop or shutting in the form of a graphic or a curve, and along with movement of the mouse, various physical variables of the supports at the mouse can be displayed rapidly.

The centralized control computer receives information of a single hydraulic support from the end controller every one second, including the serial number of the support, front pillar pressure, rear pillar pressure, ring pushing displacement and a flag bit, each bit of the flag bit represents different information, including an emergency stop, shutting, position of the coal mining machine, communication state between frames and failure information (2) Firstly three lines of supports are to be placed in the open event of this interface, each line contains 200 Richtextedit widgets each of which represents a support, then these widgets are uniformly placed on the display screen according to the actual number of supports; secondly a timer (1 s) is started, restart the timer (1 s) in a timer expiring event when the timer expires, and at the same time transmit a parameter inspection command to the end controller.

In the three lines of Richtextedit widgets, the first line represents position of the coal mining machine, thus there is a picture of the coal mining machine with two front and rear rollers being opposite up and down at the below, only one coal mining machine that represents traveling direction appears every moment, and the position of the coal mining machine is displayed to be below the support corresponding to the coal mining machine that has returned from inspection, and the other picture of coal mining machine is hided. The second line represents the number of the support controller that is pressed for an emergency stop, and this Richtextedit widget is changed to be red. The third line represents the number of the support controller that is pressed for shutting, which is represented by flickering this Richtextedit widget.

A data window of curves are set at a lower side of the interface, with three curves which represent front pillar pressure, rear pillar pressure and pushing stroke respectively.

A region of a support picture representing the protecting wall to unfold and fold, support information of the in-place coal mining machine, support profile and support information clicked by the mouse is set in an upper side of the interface. When the mouse points to any Richtextedit widget representing the support at any time, information of this support will be displayed in the region of information, and if any Richtextedit widget representing the support is clicked by the mouse, there will pops up a window displaying real-time data, on which all physical variables including analog quantity and state variable of this support will be displayed in forms of a curve, a table, a graphic and the like.

6) Program Remote Online Upgrade (1) This module is to solve the problem of program online upgrade of the end controller and the support controller of the electro-hydraulic control system, by downloading a new program code to the end controller by the centralized control computer.

After the end controller has received the program code for upgrade, it firstly judges whether the program code belongs to program of the end controller itself or program of the support controller by a synchronous head, if the program code belongs to an upgrade program of the end controller itself, then the end controller writes the received program into FLASH on line to realize an upgrade process of replacing an old program with a new program; if the program code belongs to a program of the support controller, then the end controller completes online upgrade of the end controller and the support controller on the whole working face by downloading the program to each support controller through a bus line.

(2) This interface is firstly to set a conversion data button (commandbutton) widget, to convert the compiled program file (txt) into a data window, then to transmit the text block by block, the data to be transmitted includes information such as an initial address where flash is written, length of data, and data and etc. In transmission, an address frame is transmitted at first, then a data frame is transmitted after a response from the end controller is obtained, and check manner is CRC check.

Hereinafter the specific control process of the invention is described with reference to an example of 122 supports.

1) The First Process Stage—Normal Coal Cutting (the Left Line) The 117th Support→the 6th Support:

(1) In the process that the position of the coal mining machine is moved from the 117th support to the left to the 12th support, machine tracking and frame pulling work in normal stage may be performed in accordance with an action procedure that is described when the coal mining machine is at the 54th support, as below:

if the coal mining machine runs to the 54th support, it is necessary to perform an action of unfolding a grade of protecting wall 6 supports in advance, that is, to perform an action of unfolding a grade of protecting wall at the 48th support; it is necessary to spray mist to fall dust at front and rear rollers of the coal mining machine, so that an action of spraying mist is performed at the 50th and the 58th supports; it is necessary to perform a minor cycle action at the support 8 supports behind the central position of the coal mining machine, that is, it is necessary to perform five actions including dropping pillar, lifting bottom, pulling frame, raising pillar and unfolding protecting wall at the 62th support; it is necessary to perform an action of pushing ring at the support 12 supports behind the central position of the coal mining machine, that is, it is necessary to perform an action of pushing ring at the 66th support.

(2) In the process that the position of the coal mining machine is moved from the 11th support to the left to the 6th support, it is necessary to push out a curved section in accordance with an action procedure that is described when the coal mining machine is at the 8th support, as below:

Because the curved section contains 10 supports, the curved section needs to be pushed by 10 supports in turn; when the coal mining machine runs to the 8th support, it is necessary to perform an action of unfolding a grade of protecting wall 6 supports in advance, that is, to perform an action of unfolding a grade of protecting wall at the 2nd support; it is necessary to spray mist to fall dust at front and rear rollers of the coal mining machine, so that an action of spraying mist is performed at the 4th and the 12th supports; it is necessary to perform a minor cycle action at the support 8 supports behind the central position of the coal mining machine, that is, it is necessary to perform five actions including dropping pillar, lifting bottom, pulling frame, raising pillar and unfolding protecting wall at the 16th support; it is necessary to perform an action of pushing ring at the support 12 supports behind the central position of the coal mining machine, that is, it is necessary to perform an action of pushing ring at the 20th support, i.e., to only push ring 7/10, and before this, pushing ring 10/10, 9/10, 8/10 have been performed at the 23rd, 22nd and 21st supports respectively.

2) The Second Process Stage—Left Side Sweeping Bottom Cutter 1 (the Right Line) the 6th Support→the 10th Support:

After the coal mining machine cuts coal to the machine head and cuts the coal wall through, the coal mining machine runs to the tail of the machine to perform bottom coal sweeping work, and during the process the supports at the front and rear rollers spray mist.

3) The Third Process Stage—Left Side Sweeping Bottom Cutter 1 (the Left Line) the 10th Support→the 6th Support:

The coal mining machine runs to the machine head to perform bottom coal sweeping work, and during the process the supports at the front and rear rollers spray mist.

4) The Fourth Process Stage—Left Side Inclined Cutting (the Right Line) the 6th Support→the 30th Support:

(1) In the process that the position of the coal mining machine is moved from the 6th support to the right to the 13th support, the support only performs the action of spraying mist above the front and rear rollers of the coal mining machine and an action of unfolding a grade of protecting wall 6 supports in advance.

(2) In the process that the position of the coal mining machine is moved from the 13th support to the right to the 21st support, the supports performs an action of moving the support in accordance with an action procedure that is described when the coal mining machine is at the 16th support, as below:

if the coal mining machine runs to the 16th support, it is necessary to perform an action of unfolding a grade of protecting wall 6 supports in advance, that is, to perform an action of unfolding a grade of protecting wall at the 22nd support; it is necessary to spray mist to fall dust at front and rear rollers of the coal mining machine, so that an action of spraying mist is performed at the 20th and the 12th supports;

it is necessary to perform a minor cycle action at the support 8 supports behind the central position of the coal mining machine, that is, it is necessary to perform five actions including dropping pillar, lifting bottom, pulling frame, raising pillar and unfolding protecting wall at the 8th support.

(3) In the process that the position of the coal mining machine is moved from the 22nd support to the right to the 30th support, the supports performs an action of pushing rings in groups in accordance with the following procedure: when the coal mining machine runs to the 23rd support, the 1st to the 5th supports perform an action of pushing rings in groups, when the coal mining machine runs to the 24th support, the 6th to the 10th supports perform an action of pushing rings in groups, when the coal mining machine runs to the 26th support, the 11th to the 15th supports perform an action of pushing rings in groups, when the coal mining machine runs to the 28th support, the 16th to the 20th supports perform an action of pushing rings in groups, when the coal mining machine runs to the 30th support, the 21st to the 23rd supports perform an action of pushing rings in groups, and in the process that the coal mining machine runs from the 24th support to the 27th support, the 1st to the 4th supports perform the minor cycle action for one time respectively.

5) The Fifth Process Stage—Left Side Cutting Triangle Coal (the Left Line) the 30th Support→the 6th Support:

The coal mining machine reversely exchanges the roller to start cutting triangle coal until the machine head and cut the coal wall through, and the supports at the front and rear rollers spray mist.

6) The Sixth Process Stage—Left Side Sweeping Bottom Cutter 2 (the Right Line) the 6th Support→the 10th Support:

After the coal mining machine cuts coal to the machine head and cuts the coal wall through, the coal mining machine runs to the tail of the machine to perform bottom coal sweeping work, and during the process the supports at the front and rear rollers spray mist.

7) The 7th Process Stage—Left Side Sweeping Bottom Cutter 2 (the Left Line) the 10th Support→the 6th Support:

The coal mining machine runs to the machine head to perform bottom coal sweeping work, and during the process the supports at the front and rear rollers spray mist.

8) The 8th to 14th Process Stages are Similar to that of the 1st to the 8th Process Stages.

Figure 2:
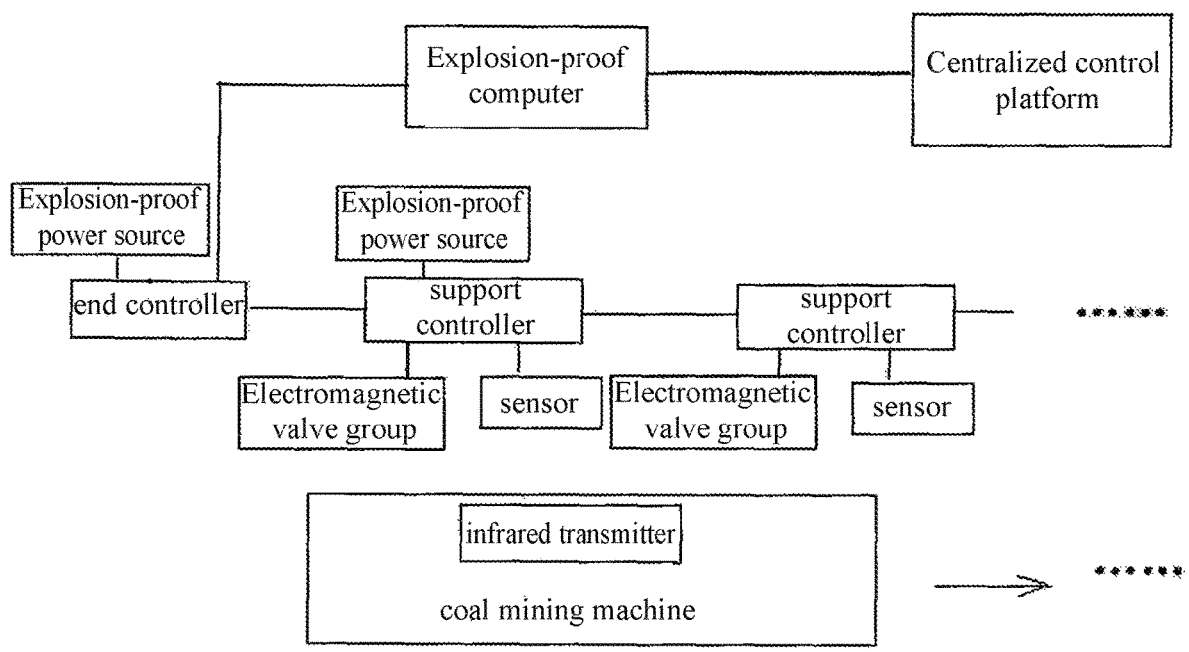
FIG. 2 is a structural diagram that the electro-hydraulic control system performs automatic machine tracking and frame pulling control according to an embodiment 2 of the invention.
Figure 3:
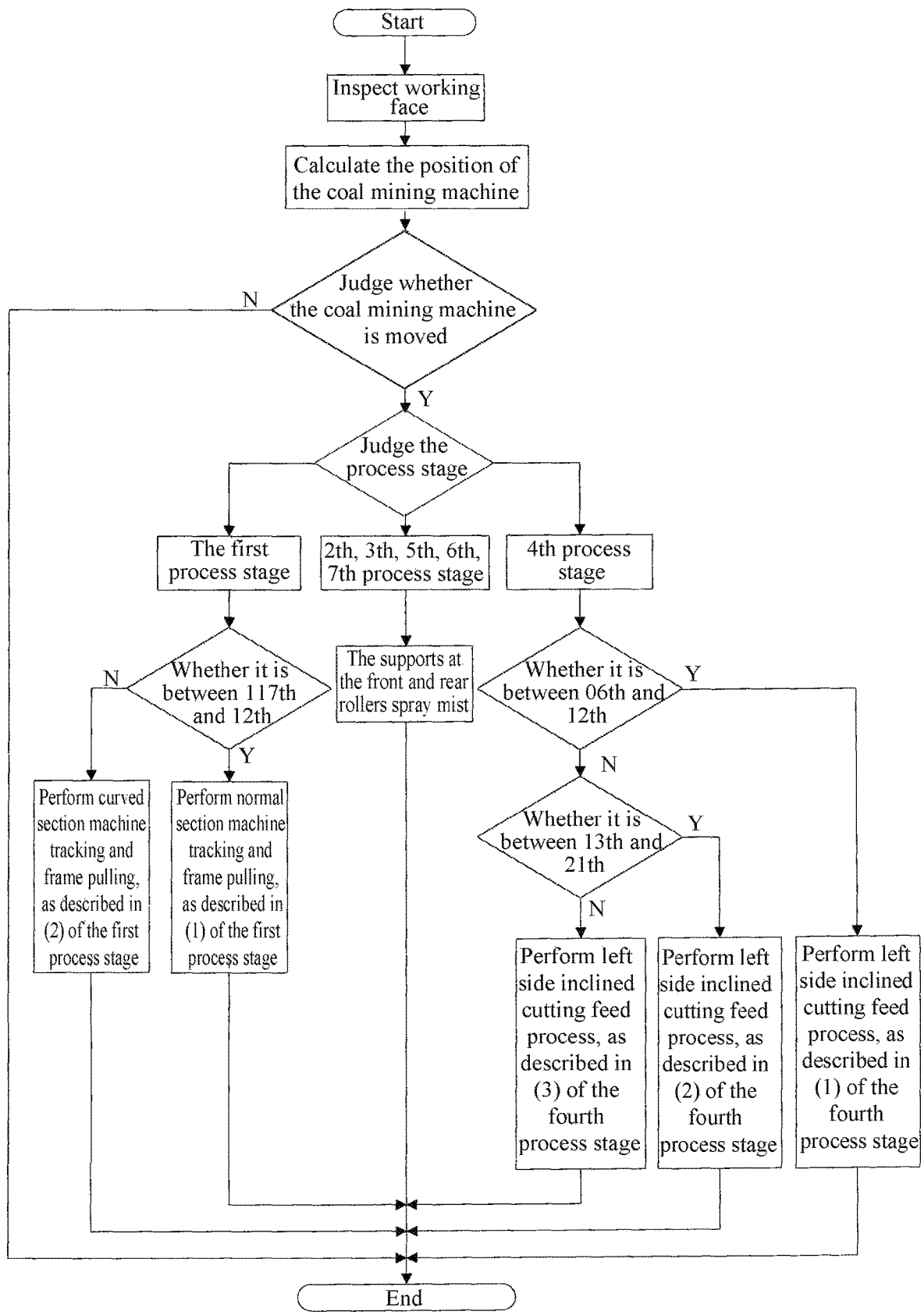
FIG. 3 is a logic block diagram that the electro-hydraulic control system performs automatic machine tracking and frame pulling control according to the embodiment 2 of the invention.

Example 2 as shown in FIGS. 2 and 3, the centralized control platform in this example includes a high-speed embedded computer UN0-3072A, a high-speed data collection card PCI-1716, a PowerBuilder front-end development platform, an SQLServer database, an Modbus TCP/IP communication protocol and an industrial Ethernet.

The centralized control platform is realized based on a large-size equipment on a fully mechanized mining working face in existing underground coal mines.

The large-size equipment includes a coal mining machine system, a hydraulic support system, a working face transportation system, a pump station system, a power supply system and a video monitoring system.

The server uses a high-speed embedded computer UN0-3072A for human-computer interaction to realize state display and real-time control of operation of the large-size equipment on a fully mechanized mining working face, and to realize unattended cooperative work of the equipments by a PowerBuilder front-end development platform; to complete the control by an IPC (Industrial Personal Computer), the IPC including a high-speed embedded computer UN0-3072A for human-computer and a high-speed data collection card PCI-1716A.

The high-speed data collection card PCI-1716A collects 16 analog quantity signals and 16 digital quantity signals and outputs 2 analog control signals and 16 digital control signals.

The centralized control platform controls the coal mining machine system by a method including: the IPC firstly collects coal mining machine monitoring information by a collection card, then compares the coal mining machine monitoring information with a set value and makes a judgment, if a comparison result does not conform to the set value, the IPC gives an alarm and displays failure information; if the comparison result satisfies the working condition, the IPC starts a belt, a crusher, a transfer machine, a scraper conveyer and an inverse coal flow of the coal mining machine in sequence.

The coal mining machine monitoring information includes cutting head vibration, current and temperature of 5 motors, temperature of a reduction gearbox, temperature, oil temperature, oil level and oil pressure of a pump box, input/output current, voltage, frequency and power of a frequency converter, running speed and running direction of the coal mining machine, flow amount and pressure of each portion of cooling water, flow amount of left and right externally spray mist, roller height, coal mining machine tilt angle;

The roller height is obtained by obtaining a roller angle by rotating an encoder, and can also be obtained by an oil cylinder stroke position sensor, which validate each other; the coal mining machine tilt angle is obtained by an electric inclinometer.

Automatic control content of the roller height of the coal mining machine includes:

1) Coal Mining Machine Roller Control Amount

A kinetic model and a mathematic model of a coal mining machine height-regulating mechanism with a height-regulated hydraulic oil cylinder:

A height-regulating rocker arm of the coal mining machine height-regulating mechanism can be regarded to be rigidly rotating around a fixed point, the height-regulated oil cylinder can be equivalent to a damping hydraulic spring a mass vibration system, represented as below:

$$J\ddot{\theta} + k_h \cdot x \cdot l \sin \Phi_2 + c_h \cdot x \cdot l \sin \Phi_2 = \Sigma M_o \quad (1)$$

in the above formula: J - - - rotational inertia of the roller and rocker arm around an zero point, kg·m²;

$\ddot{\theta}$ - - - angular acceleration of the rocker arm rotating around the zero point, rad/s²;

$k_h$ - - - hydraulic spring rigidity of the oil cylinder, N·m−1;

$c_h$ - - - hydraulic viscous damping coefficient of the oil cylinder, Pa·S;

x - - - displacement of the oil cylinder, m;

X - - - moving speed of the oil cylinder, m/s;

l - - - length of a small rocker arm, m;

$\Phi_2$ - - - an angle between the small rocker arm and an oil cylinder piston rod, rad;

$\Sigma M_o$ - - - sum of all external torques to the zero point, N·m;

external torques to the zero point include:

Resistance torque $R_a \sin \omega_a t \cdot L \cos \Phi_1$; $R_b \sin \omega_b t \cdot L \sin \Phi_1$;

Kinetic moment that hydraulic oil acts on the piston (decided by magnetic current of a servo valve);

$k_f \cdot i_f \cdot l \sin \Phi_2$;

a centrifugal moment produced by a roller eccentric mass $me\omega_2 \sin\omega t \cdot L \cos\Phi_1$; $me\omega_2 \cos\omega t \cdot L \sin\Phi_1$;

these moments of force are put into the formula (12):

$$J\ddot{\theta} + k_h \cdot x \cdot l\sin\Phi_2 + c_h x \cdot l\sin\Phi_2; = \quad (2)$$
$$R_a \sin\omega_a t \cdot L\cos\Phi_1 + R_b\sin\omega_b t \cdot L\sin\Phi_1 +$$
$$k_f \cdot i_f \cdot l\sin\Phi_2; + me\omega_2 \sin\omega t \cdot L\cos\Phi_1 + me\omega_2 \cos\omega t \cdot L\sin\Phi_1;$$

in the formula: L - - - length of a large rocker arm, m;

$\Phi_1$ - - - an angle between the large rocker arm and a horizontal plane, rad;

$k_f$ - - - electromagnetic coefficient, N/A;

$i_1$ - - - electromagnetic current, A;

m - - - eccentric mass of the roller produced due to factors such as machining, installation and pick arrangement and the like, kg;

e - - - eccentricity of the roller produced due to factors such as machining, installation and pick arrangement and the like, m;

$\omega$ - - - angular velocity of the roller, rad/s.

The displacement of the hydraulic oil cylinder is $x = l\sin\theta$, when a swing angle $\theta$ of the rocker arm around the zero point is small, it can be approximately regarded that $x = l \cdot \theta$, then the moving speed of the oil cylinder is $\dot{x} = l \cdot \dot{\theta}$, and rotational inertia of the roller and the rocker arm to the zero point:

$$J = m_1 L^2 + \frac{M_2 L^2}{3} = \frac{(3m_1 + m_2)L^2}{3}$$

put into the formula (2), and obtains:

$$\frac{1}{3}[(3m_1 + m_2)L^2]\ddot{\theta} + k_h l^2 \theta \sin\Phi_2 + c_h l^2 \sin\Phi_2 = \quad (3)$$
$$R_a \sin\omega_a t \cdot L\cos\Phi_1 + R_b \sin\omega_b t \cdot L\sin\Phi_1 + k_f \cdot i_f \cdot l\sin\Phi_2 +$$
$$me\omega_2 \sin\omega t \cdot L\cos\Phi_1 + me\omega_2 \cos\omega t \cdot L\sin\Phi_1$$

in the above formula: $m_1$ - - - concentrated mass of the roller, kg;

$m_2$ - - - concentrated mass of the rocker arm, kg;

it can be analyzed from literature that, $\omega_a = \omega_b = \omega$, and obtains finally:

$$\ddot{\theta} + A_1 c_h \dot{\theta} + A_1 k_h \theta = A_2 \sin(\omega t + \psi) + A_3 \cdot i_f \quad (4)$$

wherein:

$$A_1 = \frac{3 \cdot l_2 \sin\Phi_2}{(3m_1 + m_2)L^2};$$

$A_2 =$
$$\frac{3}{(3m_1 + m_2)L}\left[(R_a\cos\Phi_1 + R_b\sin\Phi_1 + me\omega^2\cos\Phi_1)^2 + me\omega^2\sin\Phi_1)^2\right]^{\frac{1}{2}}$$

$$\psi = \arctan\frac{R_a\cos\Phi_1 + R_b\sin\Phi_1 + me\omega^2\cos\Phi_1}{me\omega^2\sin\Phi_1}$$

$$A_3 = K_f \cdot l\sin\Phi_2.$$

Let $A_2 \sin(\omega t + \psi) = d(t)$, named it as disturbance $$\ddot{\theta} + A_1 c_h \dot{\theta} + A_1 k_h \theta = A_3 \cdot i_f + d(t) \quad (5)$$

so that $$\text{Let } \begin{cases} x_1 = \theta \\ x_2 = \dot{\theta} \end{cases}$$

thus a state equation of the system can be obtained as below:

$$\dot{X}(t) = AX(t) + Bi_f(t) + Ed(t)$$

$$y(t) = CX(t) \quad (6)$$

$$A = \begin{bmatrix} 0 & 1 \\ -A_1 k_n & -A_1 C_n \end{bmatrix}, B = \begin{bmatrix} 0 \\ A_3 \end{bmatrix}, E = \begin{bmatrix} 0 \\ 1 \end{bmatrix}$$

wherein: $C[1\ 0]$ using a zero-order holder, sampling period is T discretizing the formular (6) and obtains:

$$X(k+1) = AX(k) + Bi_f(k) + Ed(k)$$

$$Y(k) = CX(k) \quad (7)$$

wherein:

$$A = e^{A_c T} = \sum_{n=0}^{\infty} \frac{A_c^n T^n}{n} \quad (8)$$

$$B = \int_0^T e^{A_c \tau} d\tau H_c = \sum_{n=0}^{\infty} \frac{A_c^n T^{n+1}}{(n+1)!} B_c$$

$$E = \int_0^T e^{A_c \tau} d\tau D_c = \sum_{n=0}^{\infty} \frac{A_c^n T^{n+1}}{(n+1)!} D_c$$

$$C = [1\ 0]$$

assuming that the system is controllable and observable, and letting r≥m. Letting a target value is R(k)(m×1), an error signal is defined as e(k)=R(k)−y(k), then the formula (7) can obtain $$\begin{vmatrix} e(k+1) \\ \Delta x(k+1) \end{vmatrix} = \quad (9)$$
$$\begin{vmatrix} I_m & -CA \\ 0 & A \end{vmatrix} \begin{vmatrix} e(k) \\ \Delta x(k) \end{vmatrix} + \begin{vmatrix} -CB \\ B \end{vmatrix} \Delta u(k) + \begin{vmatrix} I_m \\ 0 \end{vmatrix} R(k+1) + \begin{vmatrix} -CE \\ B \end{vmatrix} \Delta d(k)$$

or can be written into $$X_o(k+1) = \Phi X_o(k) + G\Delta u(k) + G_R \Delta R(k+1) + G_R \Delta d(k) \quad (10)$$

Then the system described in the formula (10) is named as a generalized error system, assuming that target values starting from the current time (letting k=1) to the future $M_R$ step are known, this means that in order to make the output y(k) track the current target value R(k), the control output u(k) must start to change before the $M_R$ step, that is, the $M_R$ step predicts control. As for the generalized error system in the formula (3), a quadratic form of performance indexes of the formula (11) are defined:

$$J = \sum_{K=-M_R+1}^{\infty} [e^T(k)Q_r e(k) + \Delta u^T(k)H\Delta u(k)] = \quad (11)$$

$$\sum_{K=-M_R+1}^{\infty} [X_0^T(k)QX_0(k) + \Delta u^T(k)H\Delta u(k)]$$

in the formula, Q is a positive semi-definite matrix, Q and H are positive definite matrices;

it can be seen from an optimal control theory that, the input that optimizes the formula (11) has the following form:

$$\Delta u(k) = F_0 X_0(k) + \sum_{j=0}^{M_R} F_R(j)\Delta R(k+j) + \sum_{j=0}^{M_R} F_d(j)\Delta d(k+j) \quad (12)$$

wherein, $F_0 X_0$ is a full state feedback optimal solution, and $$F_0 = -[H + G^T PG]^{-1} G^T P\Phi \quad (13)$$

P is a solution of a Riccati equation $$P = Q + \Phi^T P\Phi - \Phi^T PG[H + G^T PG]^{-1} G^T P\Phi \quad (14)$$

the 2nd and the 3rd items at the right side of the formula (12) are preview feedforward compensations that utilize target value information and disturbance information starting from the current time k to the future $M_R$ step.

If only target value prediction is taken into account, letting $\Delta d(k+j)=0$ and solving $F_R(j)$, and if only disturbance prediction is taken into account, also letting $\Delta R(k+j)=0$ and solving $F_d(j)$.

According to the need, we now only research the target value prediction because what is controlled by us is memory trace cutting, $\Delta d(k+j)=0$, putting the formula (12) into the formula (11) and letting the current time (k=1), then the target value changes, namely $\Delta R(1)=R_0$, if letting $$F_{RR} = \begin{vmatrix} F_R(0) \\ F_R(1) \\ \ldots \\ F_R(M_R) \end{vmatrix}, \Delta_{RR} = \begin{vmatrix} 0 \\ G_R^T PG_R \\ \ldots \\ G^T \xi^T M_R^{-1} PG_R \end{vmatrix}, \Gamma = \text{diag}\{H + G^T PG\}$$

because $F_{RR}$ that minimizes the performance index J must satisfy $$\frac{\partial J}{\partial F_{RR} R_0} = [2\Gamma_{RR} F_{RR} + 2\Delta_{RR}]R_0 = 0$$

it is possible to obtain $F_{RR} = -\Gamma_{RR}^{-1} \Delta_{RR}$. The prediction feedforward coefficient $F_R(j)$ can be obtained by the following formula:

$$F_R(0)=0$$

$$F_R(j)=-[H+G^T PG]^{-1} G^T(\xi T)^{j-1} PG_R$$

$$j=1,\ldots,M_R$$

letting a height memory trajectory of rollers of the coal mining machine, i.e., a target trajectory is H(t), it can be deduced from analysis on the previous structure mathematic model that a target value of a swing angle of the small rocker arm is R(t), then the output error is e(k)=R(k)−y(k)=R(k)−CX(k) in accordance with the following control rule:

$$\Delta u(k) = \Delta i_f(k) = F_0 e(k) + \sum_{j=0}^{M_R} F_R(j)\Delta R(k+j) + \sum_{j=0}^{M_R} F_d(j)\Delta d(k+j) \quad (15)$$

it can be seen from the experience that, only the target value prediction is taken into account, $\Delta d(k+j)=0$, and $F_0$ and $F_R(j)$ can be obtained by putting the feedforward coefficient $F_R(j)(J=1,\ldots,M_R)$ that is obtained by prediction control into the formula (15), namely $\Delta i_f(k)$, also i.e., size of control current is obtained, regarding that the output is a digital quantity switch signal, $\Delta i_f(k)$ can be converted into time of duration of liquid flux, $M_R$ is the number of steps of prediction.

The centralized control platform controls a working face transportation system by a method comprising: firstly collecting monitoring information of the working face transportation system, then comparing the monitoring information of the working face transportation system with the set value and making judgment, and if the monitoring information does not conform to the set value, giving an alarm and displaying failure information.

The monitoring information of the working face transportation system includes current of a motor and temperature of the winding of the motor of a scraper conveyer, oil temperature, oil level and axle temperature of the reduction gearbox, pressure and flow amount of the cooling water, oil cylinder pressure; current and temperature of a motor and a belt conveyer, coal piling, smog, longitudinal tearing, tape-break, slip and tensioning failure of the belt.

The centralized control platform controls a pump station system by a method comprising: firstly collecting monitoring information of an emulation pump, then comparing the monitoring information of the emulation pump with the set value and making judgment, and if the monitoring information does not conform to the set value, giving an alarm and displaying failure information;

the monitoring information of the emulation pump includes a water supply amount, an oil supply amount, oil temperature, an oil level, inlet pressure, outlet pressure, a liquid level and concentration;

The centralized control platform controls a power supply system by a method comprising: firstly collecting the monitoring information on a primary side and a secondary side and electric leakage, over-current, short circuit, over-temperature and phase loss failure on a primary side and a secondary side of a movable transformer substation, then comparing the monitoring information on a primary side and a secondary side and electric leakage, over-current, short circuit, over-temperature and phase loss failure on a primary side and a secondary side of a movable transformer substation with the set value and making judgment, and if the above does not conform to the set value, giving an alarm and displaying failure information;

the monitoring information on a primary side of the movable transformer substation includes A/B/C phase current, high voltage, leakage current and power supply frequency, and the monitoring information on a secondary side of the movable transformer substation includes low voltage, current and insulating resistance.

The coal mining machine shall be on one end of the working face before it is started, the position of the coal mining machine at that time is set to be zero, namely an initial position, the coal mining machine constantly remembers the number of links of the scraper conveyer that the coal mining machine travels during operation, the position (at which support) of the coal mining machine is judged by the number of the links, and at the same time combining the position and distance of the coal mining machine detected by an infrared sensor from the hydraulic support system, if the two are consistent, then the action of corresponding hydraulic support is controlled automatically to realize automatic machine tracking and frame pulling, and if the two are not consistent, then giving an alarm and stopping operation of the coal mining machine; in order to reduce position errors caused by calculating the number of links of the scraper conveyor that the coal mining machine travels, each time when a round-trip coal mining process is finished, and when the coal mining machine returns to an initial end of the working face, the position of the coal mining machine is set to be zero (an initial position).

The centralized control platform automatically judges a coal mining process stage according to the position of the coal mining machine and a running direction and transmits a centralized control command such that a corresponding hydraulic support automatically tracks the coal mining machine to implement a corresponding action, according to production process requirements of coal mines, a fully mechanized mining working face is divided into 14 process stages including all processes of a middle stage, a curved stage and cutting triangle coal at both ends, and according to different lengths of the working face, the numbers of the supports are also different, then the middle stage, the curved stage and cutting triangle coal at both ends also have different numbers of supports;

The centralized control platform of the present invention can receive control parameters maintained by the hydraulic support system (including the number of supports on the working face, an action limit time, a maximum pillar pressure, a longest frame displacement stroke, length of the coal mining machine), can automatically calculate the number of starting and ending supports of the curved stage at both ends, and can automatically adapt to automatic control of a hydraulic support on a fully mechanized working face with different lengths;

The centralized control platform tracks the coal mining machine to perform an action at supports that are 30 hydraulic supports including the coal mining machine in-place support, the fourteen coal mining machine front supports and the fifteen coal mining machine rear supports, to realize automatic machine tracking and frame pulling.

The control of the present invention further includes the following contents:

(1) When the IPC starts coal mining work, it firstly collects working state information of the equipments and transmits a query signal to each equipment, and each equipment responds the appointed information indicating state of the equipment itself to the IPC after receiving the query signal, the IPC judges whether the equipments can start normal working or not, and gives a starting signal if it is regarded that the condition is satisfied;

(2) In coal mining process, if it is detected that coal piling occurs at the scraper conveyer, coal piling generally occurs at the head of the scraper conveyer, at this time the IPC immediately controls the end hydraulic support in the electro-hydraulic control system to start an iron claw that is installed on a grade of protecting wall to operate, to convey the piled coal rapidly into a transfer link, so as to ensure continuity of coal mining production;

(3) In coal mining process, the centralized control platform transmits a centralized control command to an end controller of the electro-hydraulic automatic control system, the end controller controls the support controller to perform specific action. If it is detected that communication of the hydraulic support electro-hydraulic control system is interrupted, another end controller of the electro-hydraulic control system will be started immediately, these two end controllers are responsible respectively for normally controlling the controllers at two sides of an interruption point to perform action after an interruption failure occurs, so as to ensure continuity of coal mining production;

(4) In coal mining process, the centralized control platform automatically adjusts an operating speed of the equipment of the working face transportation system according to working state of the coal mining machine, to realize maximum electric power savings;

(5) In coal mining process, the centralized control platform automatically starts a reverse-washing filter when ti is judged that inlet pressure differs from outlet pressure of the emulsion pump merely by about 1.1 Mpa, to ensure normal working of the emulsion pump and to thereby ensure continuity of coal mining production.

(6) In coal mining process, the IPC controls an automatic tensioning force of chains of the scraper conveyer according to oil cylinder pressure, current of the motor of the scraper conveyer and the position of the coal mining machine, a scraper conveyer chain automatic tensioning apparatus is controlled automatically by multiple variables, and performs control after comprehensive judgment made by combining oil cylinder pressure, operating state (operating current) of the scraper conveyer and the position of the coal mining machine and other similar variables;

(7) In coal mining process, the IPC automatically controls a camera in a video monitoring system to turn on/off according to the position of the coal mining machine, which can not only collect efficient video monitoring information but also save electric power and reduce transmission of a huge amount of video monitoring information.

3. Network Architecture

1) A control layer high-speed embedded computer UNO-3072A and high-speed embedded computers UNO-3072A of sub systems realize network communication based on the TCP/IP protocol.

2) A control layer high-speed IPC realizes TCP/IP protocol-based network communication by introducing Winsock by a PowerBuilder external matter OLE, the control layer high-speed IPC acts as a second party, i.e., a client, and it is necessary to add the following wordings in the Open event of a window of the PowerBuilder front-end development software:

ole_1.object.protocol=0//winsock the communication protocol is set as a TCP protocol;

ole_1.object.remotehost="219.226.96.151"//an ip address of the other side;

ole_1.object.remoteport=502//winsock communication port number of the other side to be contacted;

ole_1.object.connect( )//transmitting a connection request;

the control layer high-speed IPC polls all systems for one time every 500 ms, and then gives control amount according to an inspection result.

3) In TCP/IP communication, each system acts as a first party, i.e., a server end, and each has an ocx_error event script, monitors failure in communication with the centralized control platform, and once there is disconnection failure, reconnection is performed immediately, so as to ensure stable and reliable data communication:

ole_1.object.close( );
ole_1.object.protocol=0//winsock the communication protocol is set as a TCP protocol;
ole_1.object.localport=502//winsock communication port number of a native machine;
ole_1.object.listen( );
sle_1.text="TCP/IP communication error, reconnection has been performed!";

4) Applying an RBF neural network to perform coal-rock interface recognition

RBF neural network structure includes three layers, namely an input layer, an output layer and a hidden layer; the hidden layer adopts a gaussian function:

$$\Phi(x, x_i) = \exp\left(-\frac{1}{2\sigma_i^2}\|x^-x_i\|^2\right) = \exp\left[-\frac{1}{2\sigma_i^2}\sum_{k=1}^{P}(x_k - x_{ik})^2\right] \quad (16)$$

as a primary function of the RBF neural network, thus $$f(x) = \sum_{i=1}^{N} \omega_i \exp\left(-\frac{1}{2\sigma_i^2}\|x^-x_i\|^2\right) \quad (17)$$

in this way, parameters of the RBF neural network include an output unit weight value $\omega_i$, a hidden unit center $x_i$ and a function width $\sigma$.

The output unit weight value of the present invention is trained by being directly calculated by a least square method, the latter two parameters are selected by K-means Clustering, samples are clustered into M categories, a center of the clustering is a center of RBF, and then the function width is determined.

The present invention uses energy characteristic values of 20 frequency bands of a cutting head vibration signal of the coal mining machine, energy characteristic values of 8 frequency bands of a hydraulic pressure signal and energy characteristic values of 6 frequency bands of a current signal of a motor of the roller as inputs of the RBF neural network, and at the same time clusters the samples to obtain the center of the primary function, the currently cut coal rock can be judged from these signals, in the experiment the inventor extracts seven samples including 100% coal, 80% coal and 20% rock, 70% coal and 30% rock, 50% coal and 50% rock, 30% coal and 70% rock, 20% coal and 80% rock, 0% coal and 100% rock, corresponding feature vectors are categorized by clustering, i.e., 7, which is a clustering result of the above-described coal-rock samples, is used as the number of hidden layer units, and at the same time corresponding feature vector is used as the center xi of corresponding hidden units, the above-described seven states are predicted respectively by categorizing 0, 1, 2, 3, 4, 5, 6, and as the above, the RBF neural network with 34 inputs, 1 output and 7 hidden units is obtained, as a coal-rock interface recognition model, wherein x1, x2, . . . , x20 are signal feature quantities of the vibration signal after wavelet packet analysis, x21, x2, . . . , x26 are signal feature quantities of the hydraulic pressure signal after wavelet packet analysis, x27, x2, . . . , x34 are signal feature quantities of the current signal of the motor of the roller after wavelet packet analysis, $\Phi1$, $\Phi2$, . . . , $\Phi7$ are hidden layers of the RBF neural network, and its primary function is a gaussian function, and f(x) is an output result of a coal rock ratio.

5) Correction of a memory trajectory

The memory trajectory is produced under the premise that coal seam condition oriented along the coal seam in the same coal mining area can be approximately regarded as being the same, but if the coal seam is thick or there is a particular case, a curve serving as a boundary of coal and rock during cutting process may change, and the initial memory trajectory may be deviated, and accordingly in the present invention, the tracking curve is corrected constantly according to various information on the basis of memory cutting to make the control more accurate.

In the present invention, the roller angle obtained by rotating an encoder, the roller height obtained by an oil cylinder stroke position sensor and the coal mining machine tilt angle obtained by an electric inclinometer are effectively melted at a decision level according to the D-S evidence theory to obtain an actual trajectory of the roller, which is then melted with proportional information of the coal rock cut by the coal mining machine, to obtain next memory track trajectory.

In coal mining process, the control layer high-speed IPC automatically controls a tensioning force performed by the scraper conveyer chain by making a comprehensive judgment according to oil cylinder pressure, current of the motor of the scraper conveyer and the position of the coal mining machine;

Tensioning force automatic control includes pre-tensioning and automatic tensioning.

1) Pre-Tensioning

Pre-tensioning includes tensioning chains when the machine starts and loosing chains when the machine stops, for tensioning a scraper chain to a certain degree before the scraper conveyer is started to avoid failure caused by excessive loose chain; and loosing the scraper chain to a certain degree after the scraper conveyer stops, to reduce fatigue and deformation of the chain.

2) Automatic Tensioning

After the scraper conveyer transmits a starting signal and performs a pre-tensioning function, the scraper conveyer is started and transmits a signal that starting successful, and then the scraper conveyer chain automatic tensioning apparatus automatically monitors pressure of a tensioning hydraulic cylinder and performs the following comparison:

If the actually measured hydraulic cylinder pressure is lower than a lower lag range of an ideal hydraulic cylinder pressure value, starting to perform tensioning time measurement and executing a hydraulic cylinder extending program.

If the actually measured hydraulic cylinder pressure is higher than an upper lag range of an ideal hydraulic cylinder pressure value, starting to perform loosing time measurement and executing a hydraulic cylinder retraction program.

The invention claimed is:

1. A method for implementing a centralized control platform of a hydraulic support on a fully mechanized mining working face in underground coal mines, involving 30 hydraulic supports for completing a centralized control function once, including one coal mining machine in-place hydraulic support, fourteen coal mining machine front hydraulic supports and fifteen coal mining machine rear hydraulic supports; wherein the centralized control platform is connected to an electro-hydraulic control system, a TCP/IP MODBUS protocol is functioned as a communication protocol between the centralized control platform and the electro-hydraulic control system, the centralized control platform acts as a client, and the electro-hydraulic control system acts as a server end; an infrared transmission apparatus is mounted on a coal mining machine, a receiving apparatus is embedded into a holder controller of the electro-hydraulic control system, the holder controller receives infrared information from the infrared transmission apparatus and transmits the infrared information to an explosion-proof computer of the electro-hydraulic control system; the electro-hydraulic control system includes a holder control system, an end centralized control system and a crossheading monitoring system, the centralized control platform transmits a position of the coal mining machine to the explosion-proof computer of the electro-hydraulic control system in real time; the method comprising:

(1) firstly transmitting, by the centralized control platform, a command of startup to the electro-hydraulic control system, and after obtaining a response that the electro-hydraulic control system has been prepared, transmitting, by the centralized control platform, a position signal of the coal mining machine and a process stage signal to the electro-hydraulic control system and starting the coal mining machine at the same time;

(2) sending out a control command, by the electro-hydraulic control system, based on the position signal of the coal mining machine and a position detection signal of an encoder of the coal mining machine, such that a related hydraulic support automatically tracks the coal mining machine;

(3) comparing, by the explosion-proof computer of the electro-hydraulic control system, information of two detection positions of the coal mining machine, transmitting normal information by the explosion-proof computer and continuing to implement next control by the centralized control platform if the two detection positions are the same; transmitting an alarm information by the explosion-proof computer such that the electro-hydraulic control system stops giving the control command if the two detection positions are different; wherein, the information of the two detection positions of the coal mining machine refers to the position signal of the coal mining machine transmitted from the centralized control platform and the position signal of the coal mining machine transmitted from the infrared transmission apparatus;

(4) transmitting, by the centralized control platform, a number of current process stage and the position detection signal of the encoder of the coal mining machine to the electro-hydraulic control system every 0.5 s after the coal mining machine is started normally; providing, by the electro-hydraulic control system, information including front pillar pressure, rear pillar pressure, displacement stroke and a first state variable of the coal mining machine in-place hydraulic support, the coal mining machine front hydraulic supports and the coal mining machine rear hydraulic supports as a response after receiving the position detection signal of the encoder of the coal mining machine from the centralized control platform, wherein the first state variable includes whether the hydraulic support is normal or not, whether the holder controller is normal or not, whether an end controller is normal or not and whether communication is normal or not, so that the centralized control platform makes judgment whether centralized control can be continued or not;

(5) judging, by the electro-hydraulic control system at anytime, whether physical variables related to an operation reach limit parameters, whether a displacement stroke is still not in place after a given operation limit time has passed, whether control information and return information form a closed loop or not; and whether communication is smooth or not when the electro-hydraulic control system controls an operation of the hydraulic support based on the number of current process stage and the position signal of the coal mining machine that are transmitted by the centralized control platform;

(6) transmitting, by the centralized control platform, a write request of the number of process stage and the position of the coal mining machine to the electro-hydraulic control system, and transmitting a read request for collecting signals of the electro-hydraulic control system in real time at the same time, judging the type of a request by the explosion-proof computer of the electro-hydraulic control system after obtaining a request from the centralized control platform;

(7) transmitting data in the read request in a form of a TCP/IP MODBUS protocol to the centralized control platform by the explosion-proof computer after the electro-hydraulic control system has received the read request from the centralized control platform; wherein, firstly transmitting first five numbers that are received; and secondly transmitting b×2+3 numbers, wherein, b is a number required by the client; and thirdly transmitting a 7th and an 8th numbers (i.e., device address and function code) that are received; and fourthly transmitting b×2 numbers; and fifthly transmitting a head address where the data is saved; and next transmitting data volume in sequence, and finally transmitting a check code;

(8) performing analysis and judgment by the centralized control platform after receiving the data transmitted from the step (7), and stopping operation of the coal mining machine timely when there is a failure and giving an alarm at the same time.

2. The method for implementing a centralized control platform of a hydraulic support on a fully mechanized mining working face in underground coal mines according to claim 1, further comprising: feeding back position information of the coal mining machine timely by an infrared reception apparatus; when an end controller of the electro-hydraulic control system inspects the holder controller, collecting position information, front pillar pressure, rear pillar pressure, displacement stroke and a second state variable of the coal mining machine together, and then transmitting them to the explosion-proof computer of the electro-hydraulic control system by the holder controller, wherein the second state variable comprises presence or absence of a scram signal, presence or absence of a blocking signal, presence or absence of an infrared signal, whether pillar pressure is normal or not, whether a displacement is in place or not and whether communication is normal or not.

3. The method for implementing a centralized control platform of a hydraulic support on a fully mechanized mining working face in underground coal mines according to claim 1, wherein after the electro-hydraulic control system has received the control command from the centralized control platform, decomposing and transmitting the control command to the end centralized control system by the explosion-proof computer, then transmitting the control command to the holder controller of the holder control system by the end controller of the end centralized control system to implement specific control; or decomposing and transmitting the control command to the holder controller of the holder control system directly by the explosion-proof computer to implement specific control.

4. The method for implementing a centralized control platform of a hydraulic support on a fully mechanized mining working face in underground coal mines according to claim 1, further comprising: realizing automatic machine tracking and frame pulling according to an infrared position signal of the coal mining machine and a coal mining process stage by the end controller after the explosion-proof computer transmits the control command to the end controller of the end centralized control system by a serial port using an MODBUS protocol.

5. The method for implementing a centralized control platform of a hydraulic support on a fully mechanized mining working face in underground coal mines according to claim 4, wherein realizing automatic machine tracking and frame pulling includes three stages: inspection, judgment and control, wherein obtaining the position of the coal mining machine by one inspection, and judging a traveling direction of the coal mining machine on the working face by inspecting the position of the coal mining machine twice; the inspection is that the end controller of the end centralized control system accesses each holder controller for one time in the form of single chip microcomputer serial port multi-level communication work every 0.5 s, to collect all of the information of the holder controller into the end controller; the judgment is that the end controller firstly judges whether the position of the coal mining machine inspected by the holder controller is consistent with the position of the coal mining machine transmitted by the explosion-proof computer or not according to collected information of the holder controller and an infrared position signal of the coal mining machine and the coal mining process stage that are transmitted by the explosion-proof computer through the serial port, if the position of the coal mining machine inspected by the holder controller is not consistent with the position of the coal mining machine transmitted by the explosion-proof computer, the end controller gives an alarm and stops operation, and if the position of the coal mining machine inspected by the holder controller is consistent with the position of the coal mining machine transmitted by the explosion-proof computer, the end controller proceeds to next control stage, that is, according to coal mining process procedure, transmits commands to related holder controllers around the coal mining machine to control corresponding hydraulic supports to operate in accordance with a sequence of frame dropping—bottom lifting—frame pulling—frame raising, to perform machine tracking and frame pulling.

* * * * *